(12) United States Patent
Imasaka et al.

(10) Patent No.: US 9,198,408 B2
(45) Date of Patent: Dec. 1, 2015

(54) MOVING BODY DISPLAY DEVICE

(75) Inventors: Masashi Imasaka, Nishinomiya (JP);
Eisuke Sekine, Nishinomiya (JP)

(73) Assignee: FURUNO ELECTRIC COMPANY LIMITED, Hyogo (JP)

(*) Notice: Subject to any disclaimer, the term of this patent is extended or adjusted under 35 U.S.C. 154(b) by 628 days.

(21) Appl. No.: 12/894,867

(22) Filed: Sep. 30, 2010

(65) Prior Publication Data
US 2011/0082644 A1    Apr. 7, 2011

(30) Foreign Application Priority Data

Oct. 1, 2009    (JP) .................................. 2009-229868

(51) Int. Cl.
*G05D 1/06* (2006.01)
*A01K 97/00* (2006.01)
*G01C 21/20* (2006.01)
*G08B 1/08* (2006.01)

(52) U.S. Cl.
CPC .............. *A01K 97/00* (2013.01); *G01C 21/203* (2013.01); *G08B 1/08* (2013.01)

(58) Field of Classification Search
USPC ................................... 701/300, 521, 468, 41
See application file for complete search history.

(56) References Cited

U.S. PATENT DOCUMENTS

| | | | |
|---|---|---|---|
| 6,266,614 B1 | 7/2001 | Alumbaugh | |
| 6,628,569 B1* | 9/2003 | Steiner et al. .................. | 367/111 |
| 6,798,356 B2* | 9/2004 | Flick .............................. | 340/989 |
| 8,111,680 B2* | 2/2012 | Ijiri ....................... | G01S 5/0027 370/345 |
| 8,180,507 B2* | 5/2012 | Dokken .............. | G01S 13/9307 340/903 |
| 8,296,001 B1* | 10/2012 | Kabel .................... | G01C 21/22 340/988 |
| 8,706,329 B2* | 4/2014 | Brown .................... | G01C 21/00 701/21 |
| 2001/0054961 A1* | 12/2001 | Twining ................. | A01K 97/00 340/573.1 |
| 2003/0028293 A1* | 2/2003 | Jankowiak et al. ............. | 701/21 |
| 2003/0028294 A1* | 2/2003 | Yanagi ...................... | G01S 7/22 701/21 |

FOREIGN PATENT DOCUMENTS

| | | |
|---|---|---|
| CN | 1588476 A | 3/2005 |
| CN | 101046393 A | 10/2007 |
| CN | 101101304 A | 1/2008 |
| CN | 101339046 A | 1/2009 |
| JP | 5-288562 A | 11/1993 |
| JP | 2002-288800 A | 10/2002 |
| JP | 2004-290025 A | 10/2004 |

OTHER PUBLICATIONS

1st Office Action of the corresponding Chinese Patent Application No. 201010503417.1, dated Apr. 22, 2014.
2nd Office Action of the corresponding Chinese Patent Application No. 201010503417.1, dated Mar. 9, 2015.

* cited by examiner

*Primary Examiner* — Thomas G Black
*Assistant Examiner* — Ana Thomas
(74) *Attorney, Agent, or Firm* — Global IP Counselors, LLP

(57) ABSTRACT

This disclosure provides a moving body display device, which includes a position calculating module for acquiring a positioning signal of a target moving body and calculating a position of the moving body, a behavior calculating module for calculating a positional change of the moving body based on the positioning signal, and a position storage module for storing a position where the positional change is detected when the positional change that satisfies a determination condition set is detected.

11 Claims, 7 Drawing Sheets

| INPUT POSITION | TIME AND DATE | MARK APPEARANCE INFORMATION |
| --- | --- | --- |
| (Lat, Lon) | (YYMMDDhhmm) | ⚑ |
| (Lat, Lon) | (YYMMDDhhmm) | 🐟 |
| (Lat, Lon) | (YYMMDDhhmm) | ⚑ |
| (Lat, Lon) | (YYMMDDhhmm) | ⚑ |
| (Lat, Lon) | (YYMMDDhhmm) | 🐟 |
| (Lat, Lon) | (YYMMDDhhmm) | ⚑ |

FIG. 3A

| SEASON | MARK |
| --- | --- |
| SPRING | 🐟 |
| SUMMER | 🐟 |
| FALL | 🐟 |
| WINTER | 🐟 |

FIG. 3B

MOVING BODY DISPLAY DEVICE

CROSS-REFERENCE TO RELATED APPLICATION(S)

The application claims priority under 35 U.S.C. §119 to Japanese Patent Application No. 2009-229868, which was filed on Oct. 1, 2009, the entire disclosure of which is hereby incorporated by reference.

TECHNICAL FIELD

The present invention relates to a moving body display device for displaying a position of a moving body determined based on a positioning signal, and a mark indicating a specific location, on a display screen.

BACKGROUND

Conventionally, plotter devices (moving body display devices) that can store specific locations, such as harbors, gas stations, and locations where people caught a lot of fish, and display marks indicating these specific locations along with a ship position (position of a moving body) are known. For example, JP H05-288562(A) discloses this kind of plotter device.

Meanwhile, another kind of plotter device has a function to create a route from a starting point to a destination, and display the route on a screen along with a ship position. On the route, course-change points are set as locations where the ship changes the course. Typically, the course-change points are set so that the starting point connects with the destination, considering areas (including shallow water, a no-trespassing area, an island, a peninsula) which must be avoided on navigation. A method of creating the route may include storing points (positions) through which the ship passed as marks, and creating the route based on these marks. Further, another method may include setting marks which are set in advance by an operator to the starting point, stopover location(s), destination and the like, and creating the route by connecting these marks.

The method of automatically creating the route based on the points through which the ship passed is useful because the route actually taken by the ship can be reproduced. However, because the points through which the ship passed are set at a fixed interval by distance, time or the like, the course-change points are not necessarily set as the locations where the ship actually changed the course.

Meanwhile, as a method of improving the reproducibility of the route where the ship traveled in the past, the interval at which the marked positions are set may be shortened. However, if the interval at which the marked positions are set is shortened, the number of the marks to be set increases more than needed and, thus, the display screen may be visually degraded. If the number of the marks to be stored is increased, the storage area of the memory will be occupied more and a load of display processing and the like will be increased. For this reason, a method of manually setting the marks as the course-change points while the ship is changing the course may be considered. However, carrying out the operation of setting the marks whenever the ship changes the course requires a lot of time and effort, and the operator may forget the input operation of the marks just because he/she has to concentrate on navigation.

This can also be said for the input operation of the mark when storing a position where a comparatively large-sized fish such as a spearfish is caught as a fishing point. When one has a bite of the large-sized fish, in order to ensure the fish bite on the hook (hookup) or the like, a speed of the ship is desired to be rapidly increased immediately after the fish bite. However, under such a tense situation where the rapid ship handling is required, it is difficult for the operator to set the mark manually, while performing the operation of increasing the ship speed. Further, even if the operator tries to input the mark as the point where the fish bite occurs after the large-sized fish is caught or after the fish escaped, the ship has already moved away from the actual fish bite position at that time point in many cases. Therefore, it is difficult to accurately store the position where the fish bite occurs as the mark.

SUMMARY

The present invention is made in view of the above situation, and provides a moving body display device that can detect a specific behavior of a moving body and automatically store a position where the behavior is occurred.

According to an aspect of the present invention, a moving body display device is provided, which includes a position calculating module for acquiring a positioning signal of a target moving body and calculating a position of the moving body, a behavior calculating module for calculating a positional change of the moving body based on the positioning signal, and a position storage module for storing a position where the positional change is detected when the positional change that satisfies a determination condition set is detected.

Thereby, by appropriately setting the determination condition, a specific behavior of the moving body can be detected and the detected position can be automatically stored. Therefore, it can be certainly prevented that an operator lost a location because he/she forgot an operation of storing the position, and the location for which the stored position deviates greatly from an intended location. In addition, because the position where the specific behavior exhibited by the moving object is stored, the operator can set the position where the specific behavior is detected as a destination, or can set it as a pass point along a route heading toward the destination.

The behavior calculating module may calculate a speed or a direction. The position storage module may store, when it detects that the speed calculated by the behavior calculating module changes by a predetermined amount of change or more within a predetermined period of time, or when the direction calculated by the behavior calculating module changes by a predetermined angle or more within the predetermined period of time, a position where the change is occurred.

In the moving body display device, at least one of the conditions of the predetermined period of time, the predetermined amount of change, and the predetermined angle may be changed according to a speed of the moving body.

The moving body display device may further include a mark display processing module for displaying in a display screen a mark at a position where the positional change is occurred.

The position storage module may store the position where the positional change is occurred and store a speed of the moving body. The mark display processing module may set the mark of a different appearance according to the speed.

The position storage module may store the position where the positional change is occurred and store a time at which the position is stored. The mark display processing module may display the mark in a different appearance according to the time.

The moving body display device may be configured to connect with a depth sounding module for detecting a water depth. The mark display processing module may display the mark in a different appearance according to the water depth at the time of storing the position where the positional change is occurred.

The moving body display device may have a prohibiting function to prohibit storing of the position where the positional change is occurred when a predetermined condition is satisfied.

The mark display processing module may not display the mark on the display screen when a predetermined condition is satisfied.

The predetermined condition may be satisfied when the position stored in the past where the positional change was occurred exists within a prescribed range set based on the position of the moving body.

The predetermined condition may be satisfied when the moving body exists within a prescribed range set based on an inputted position set in advance, or when the inputted position set in advance exists within a prescribed range set based on the position of the moving body.

The moving body may be a ship. The predetermined condition may be satisfied when the ship exists within a prescribed range set based on a coastline, or when the coastline exists within a prescribed range set based on the position of the ship.

The moving body may be a first ship. The moving body display device may be configured to connect with an identification information receiver for receiving identification information on a second ship. The predetermined condition may be satisfied when the second ship that transmitted the identification information exists within a prescribed range set based on the position of the first ship, or when the first ship exists within a prescribed range set based on the position of the second ship.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 3A and 3B are diagrams schematically showing items of mark tables stored in a memory;

DESCRIPTION OF EMBODIMENT

Figure 1:
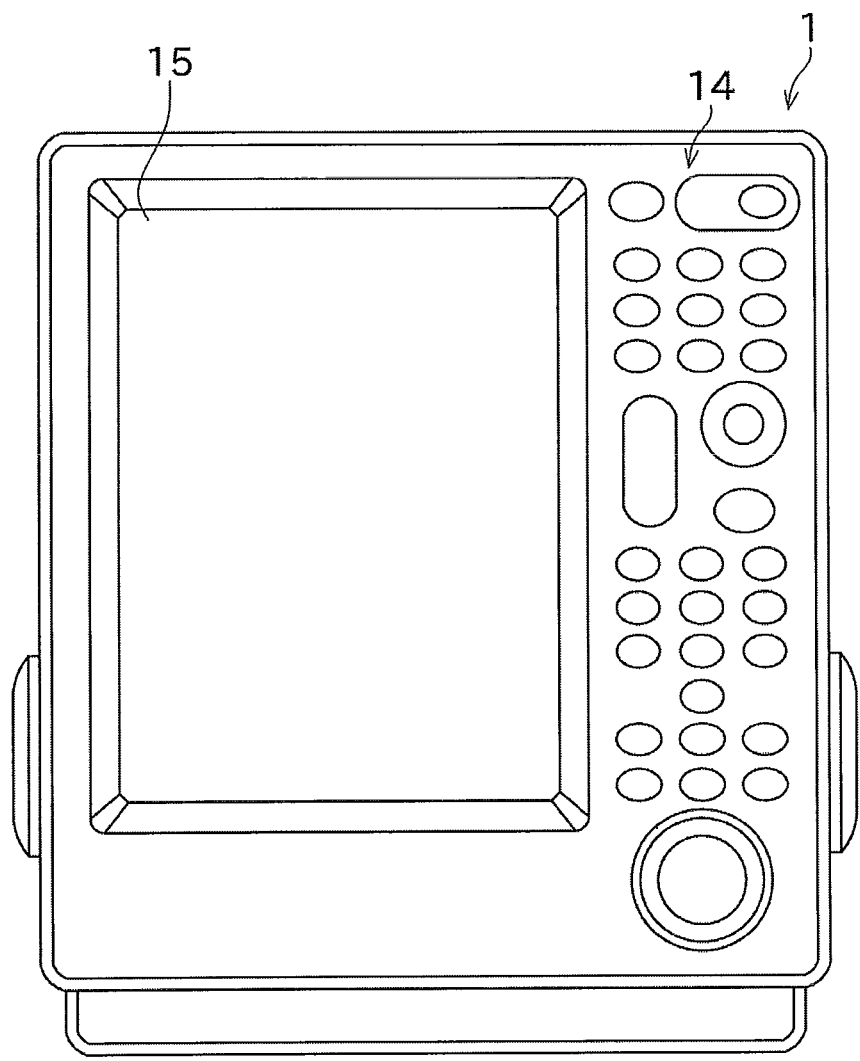
FIG. 1 is an elevational view of a plotter device according to an embodiment of the present invention.
Figure 2:
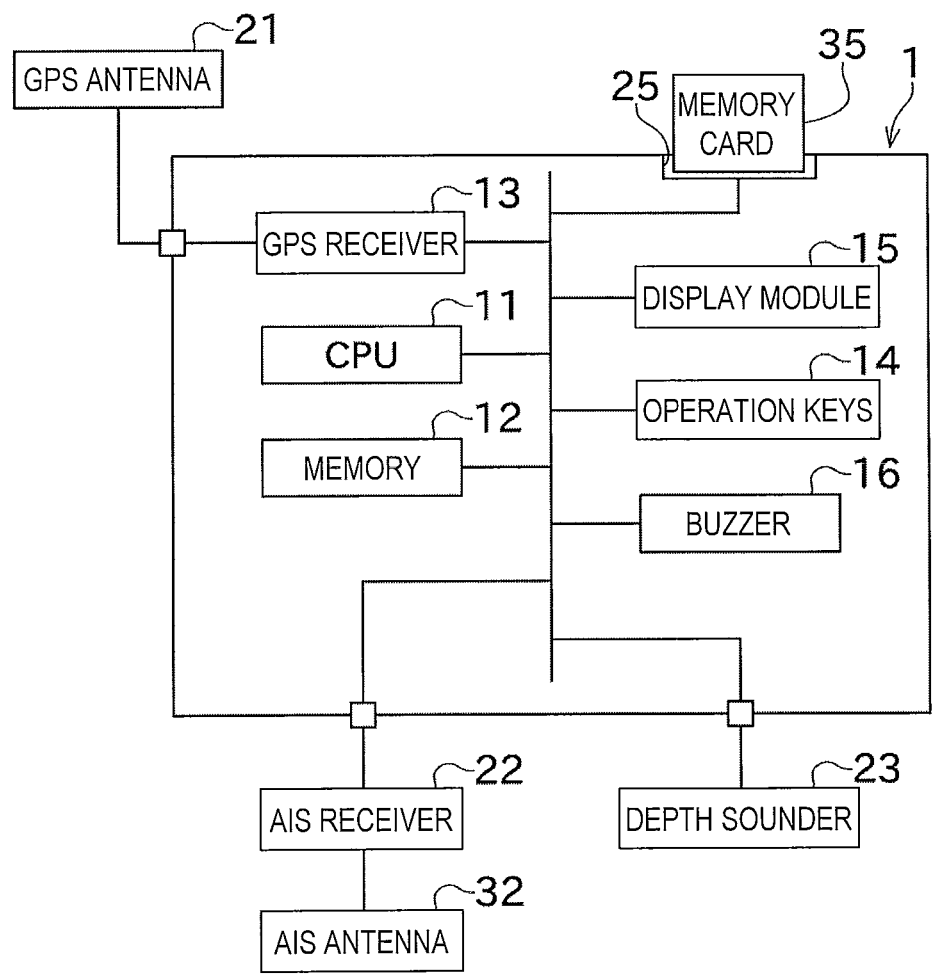
FIG. 2 is a block diagram showing a substantial part of an electric configuration of the plotter device.

Next, an embodiment of the present invention is described. FIG. 1 is an elevational view of a plotter device 1, which is an example of a moving body display device (trail display device) according to the embodiment of the invention. FIG. 2 is a block diagram showing a substantial part of an electric configuration of the plotter device 1. FIG. 3 is a diagram schematically showing items of a mark table stored in a memory.

The plotter device 1 is used as one of ship instruments, and displays a position of a moving body or ship where the plotter device 1 is equipped (hereinafter, referred to as "the ship concerned" or simply referred to as "the ship") along with a nautical chart. As shown in FIGS. 1 and 2, the plotter device 1 includes a CPU 11, the memory (memory 12), a GPS receiver 13, operation keys 14, a memory card connecting module 25, a display module 15, and a buzzer 16, as its substantial configuration. As shown in FIG. 2, a GPS antenna 21, a depth sounder 23 (depth sounding module), and an AIS receiver 22 are connected with the plotter device 1.

Moreover, the plotter device 1 is network-connected with external devices (omitted in the drawings), such as a radar antenna (radar device) and a fish finder, via a hub, and is configured to acquire positional information on other ships and information on the existence of fish to display the information on the display module 15. Data communications between the plotter device 1 and the external devices are performed using appropriate communication protocols. As an example of the communication protocols, a communication protocol defined by the NMEA (National Marine Electronics Association) 2000 may be employed.

The plotter device 1 has a function to store a specific location as latitude-and-longitude information, and display the specific location as a mark at a corresponding position in the screen image displayed on the display module 15. In addition, the plotter device 1 of this embodiment has a mark automatic input function to detect a specific behavior of the ship and automatically store a position where the specific behavior is occurred. In addition, the plotter device 1 has a route creating function where a route is created based on information such as the marks stored in advance or a trail can be stored as the route.

Next, a configuration of the plotter device 1 that implements the mark automatic input is described. In the following description, storing the marked position and appearance information and the like on the mark corresponding to the marked position in the memory 12 may be referred to as "inputting the mark."

The CPU 11 controls each component of the plotter device 1. In a state where the automatic input function of the plotter device 1 is active (ON), the CPU 11 observes the information indicating the ship's behavior sent from the outside, and when the ship exhibits the specific behavior, then performs the control for automatically inputting the mark, various kinds of processing associated with the input of the mark. The CPU 11 of this embodiment has a function as a mark display processing module that performs processing for displaying the position that is automatically stored in the memory 12 as the mark on the display screen.

The memory 12 can store various kinds of information, such as the trail information and the route information. The memory 12 also has a function as a position storage module for storing information on the position of the mark and the like. As shown in FIG. 3A, the memory 12 stores the latitude-and-longitude information (Lat and Lon) indicating the position of the mark, information indicating time and date (YYMMDDhhmm) at which the mark was inputted, the mark information for determining the appearance of the mark and the like in a table form. Lat is information indicating a latitude and Lot is information indicating a longitude. Regarding YYMMDDhhmm, YY means year (for example, 00 if the year is 2000), MM means month, DD means date, hh means hour, mm means minute. The mark information is information on the mark, indicating the appearance and means information indicating a shape, a color, and a pattern of the mark. In FIGS. 3A and 3B, the mark information is expressed graphically in order to give description intelligible, but, in fact, it is stored as a mark code (number(s), alphabet(s), etc.) corresponding to the appearance to be displayed on the display module 15.

The GPS receiver 13 is inputted with signals from the GPS satellites which the GPS antenna 21 connected with the exterior of the plotter device 1 received, and the position of the ship concerned (hereinafter, it may be referred to as "the ship position") is calculated based on the signals. The GPS receiver 13 is configured to output ship speed information and ship course information based on the information on the positioning signals. The ship speed information and the course information outputted from the GPS receiver 13 are transmitted to the CPU 11, and the CPU 11 observes the ship's behavior based on these information. As described above, the GPS receiver 13 of this embodiment is configured so that it functions as a position calculating module for calculating the ship position, as well as functions as a behavior calculating module for calculating the ship's behavior. In the following description, the course may be expressed as a "ship's heading" in the meaning that the course indicates a direction in which the ship travels.

The operation keys 14 are an operator interface to cause the plotter device 1 to perform various kinds of functions of the plotter device 1. The operator operates the operation key(s) 14 to call a menu screen image on the display module 15 and then changes various kinds of settings. Various kinds of conditions at the time of performing the mark automatic input can also be changed by the operation of the operation key(s) 14.

The memory card connecting module 25 connects a memory card 35 (nautical chart information medium) with the plotter device. The memory card 35 connected with the memory card connecting module 25 stores nautical chart data of coastlines and the like in advance. The CPU 11 can read into the memory 12 the chart data stored in the memory card 35 to display it on the display module 15.

The display module 15 for displaying a display screen image displays various kinds of information, such as the ship, trail, mark, and map, and is configured by a liquid crystal display or the like. The plotter device 1 of this embodiment is configured to simultaneously display the displayed information indicating the ship position, trail, and mark, and the displayed information indicating school-of-fish information and the like on the display module 15 so that these information are vertically or horizontally divided into two parts, respectively.

The buzzer 16 as an informing module is configured as a sounding device that generates a sound when an operating signal is received from the CPU 11. In this embodiment, the buzzer 16 is actuated when the mark is automatically inputted.

The AIS receiver 22 connected with the plotter device 1 receives identification information from AISs (Automatic Identification Systems) carried in other ships. The AIS receiver 22 is connected with an AIS antenna 32 for receiving VHF electric waves transmitted from the AISs carried in other ships. The plotter device 1 of this embodiment is configured to display on the display module 15 the identification information on other ships based on the identification information which the AIS receiver 22 received via the AIS antenna 32.

The depth sounder 23 outputs an ultrasonic wave and receives a corresponding reflection wave to acquire depth information. The CPU 11 can display water depth information on the display module 15 based on the information transmitted from the depth sounder 23.

Figure 4:
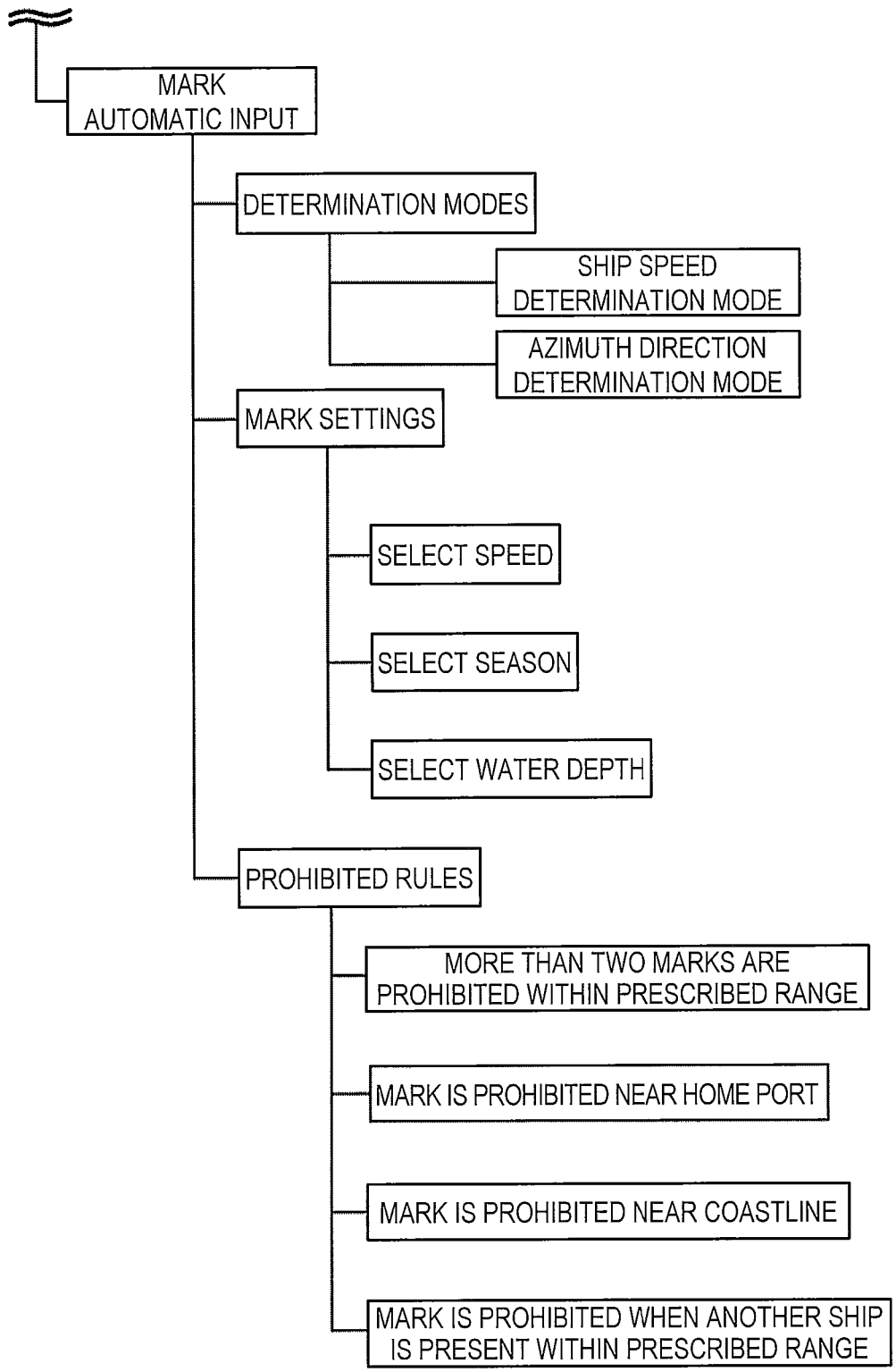
FIG. 4 is a schematic diagram where an example of a menu screen image in which a mark automatic input is set is expressed by a menu tree.
Figure 5:
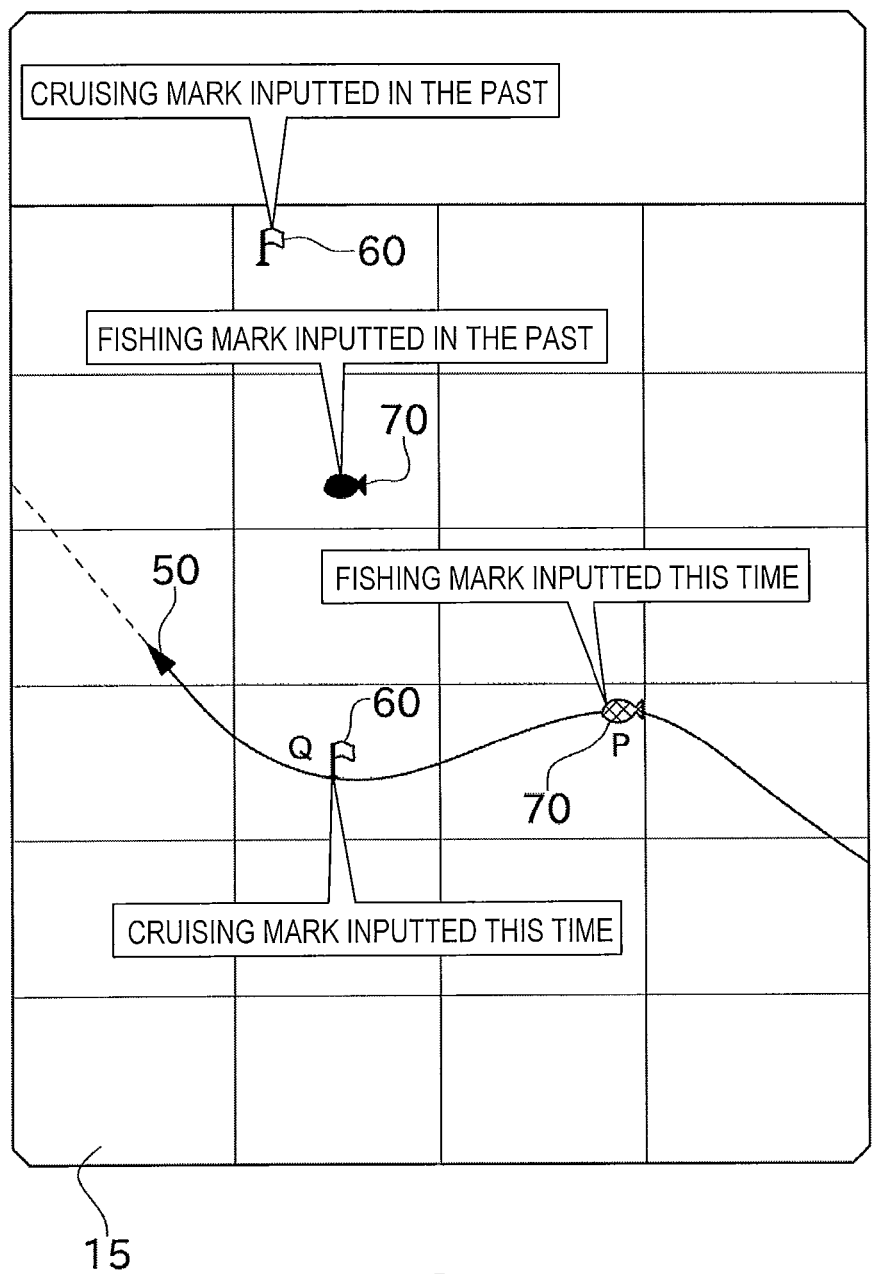
FIG. 5 is a schematic diagram of a display image showing how to perform the mark automatic inputs.

With the above configuration, the plotter device 1 displays the ship position, trail, mark, and nautical chart on the display module 15. Next, referring to FIGS. 4-5, 6A-6D and 7, the mark automatic input function is described in detail. FIG. 4 is a schematic diagram of an example of a menu screen image where the mark automatic input is set, which is expressed by a menu tree. FIG. 5 is a schematic diagram of a display image where the mark automatic input is performed. FIG. 6 is a schematic diagram of a display image when the mark automatic input is not performed due to the prohibited rule. FIG. 7 is a flowchart showing processing of the mark automatic input.

First, conditions at the time of performing the mark automatic input are described, while referring to a method of setting the mark automatic input function. The plotter device 1 of this embodiment is configured so that the operator operates a menu key which the operation keys 14 have to display a main menu on the display module 15, and then performs various kinds of settings from the main menu screen. The operator can select the "mark automatic input" which is one of the items displayed on the main menu, and appropriately operates the operation key(s) 14 to switch ON/OFF of the mark automatic input and set the conditions of the mark automatic input.

As shown in FIG. 4, when the mark automatic input is selected from the main menu, "determination modes," "mark settings," and "prohibited rules" are displayed. When each item is selected, various kinds of settable conditions are displayed.

The "determination mode" is an item for selecting a method of detecting the ship's behavior, and in this embodiment, the method of detecting the ship's behavior can be selected from two kinds of modes: a "ship speed determination mode" and an "azimuth direction determination mode." In the determination mode, one of the ship speed determination mode and the azimuth direction determination mode may be selected, or a combining of both determination modes (detecting methods) may be selected.

The "ship speed determination mode" is a mode in which the marked position is automatically set based on the ship speed information outputted based on the positioning signals from the GPS receiver 13. In the ship speed determination mode, a ship speed determination time (predetermined period of time) and a set change amount (predetermined amount of change) are used as the determination conditions with which the marked position is set. The CPU 11 sets the marked position automatically when the ship speed exceeds the set change amount, within the ship speed determination time. For example, if the ship speed determination time is set to 5 seconds and the set change amount is set to 5 kt, the marked position is set automatically when the ship speed is increased or decreased by 5 kt or more in 5 seconds.

The determination conditions in the ship speed determination mode may also be set to perform the automatic input of the mark only when the ship speed changes within the ship speed determination time so that the ship speed exceeds the set change amount temporarily from a ship speed at the start of the time count. That is, the automatic input of the mark is performed only when the ship speed changes within the ship speed determination time so that the ship speed once exceeds the set change amount and then returns to the ship speed at the start of the ship speed determination time count. Therefore, on this determination condition, only the ship's behavior in which the ship repeatedly accelerates or decelerates (an abrupt deceleration to stop the ship or an abrupt acceleration to start the ship) is detected, and it is effective to detect only the temporary abrupt acceleration or deceleration.

The "azimuth direction determination mode" is a mode in which the marked position is automatically set based on the azimuth direction information outputted based on the positioning signals from the GPS receiver 13. In the azimuth direction determination mode, an azimuth direction determination time (predetermined period of time) and a set angle (predetermined angle) are the determination conditions for setting the marked position. The CPU 11 sets the marked position automatically when the ship's heading changes so that it exceeds the set angle within the azimuth direction determination time.

In addition, in the azimuth direction determination mode, the determination conditions are automatically changed according to the ship speed so that a sensitivity is lowered when the ship speed is slow and the sensitivity is raised compared with the case where the ship speed is slow when the ship speed is fast. By performing such processing, even when the speed of the ship which is easy to be influenced by disturbance such as a wave and which heading changes frequently is slow, an excessive automatic input of the mark can be prevented. The ship speed is a ship speed at the time of counting the azimuth direction determination time. In this embodiment, a ship speed average value, which is obtained by averaging the ship speeds for five seconds before the start of the azimuth direction determination time count, is used as the ship speed at the time of counting the azimuth direction determination time. The plotter device 1 stores in advance a ship speed determination value for determining the ship speed, and it determines whether the ship speed is slow or fast by comparing the ship speed average value with the ship speed determination value. More specifically, if the ship speed determination value is set to 10 kt, the plotter device 1 processes as follows. That is, when the inputted ship speed average value is 10 kt or faster, the CPU 11 performs a control to set the azimuth direction determination time to 30 seconds and the set angle to 30 degrees, and when the ship speed average value is slower than 10 kt, set the azimuth direction determination time to 60 seconds and the set angle to 60 degrees.

As described above, by turning on at least any of the functions of the ship speed determination mode and the azimuth direction determination mode, the specific ship's behavior can be detected and the marked position can be set automatically. The plotter device 1 of this embodiment is configured so that the numerical values that determine various kinds of conditions, such as the ship speed determination time, the set change amount, the azimuth direction determination time, the set angle, and the ship speed determination value, can be changed by the operator. Thereby, the operator can adjust the determination conditions according to the displacement, capabilities, purpose of use, and the like of the ship.

Next, the "mark settings" are described. The plotter device 1 of this embodiment is configured to display the appearance of the mark differently according to the conditions at the time of the automatic mark input. The operator selects the mark setting to set the conditions for determining the appearance of the mark at the time of the mark automatic input. As shown in FIG. 4, when the mark settings is selected, "select speed," "select season," and "select water depth" are displayed. Next, these displayed items are described.

In the "select speed," the switch of ON/OFF of the function for determining the shape of the mark displayed according to the ship speed and the change of the conditions can be performed. The ship speed is the same as the ship speed average value described above in this embodiment, and it is compared with the mark shape determination value set in advance and the shape of the mark is determined according to the result. In this embodiment, when the ship speed is fast, it determines to be a state where traveling is an objective of the ship, and a cruising mark 60 (a flag mark shown in the mark information of FIG. 3A) is set to the shape of the mark. On the other hand, when the ship speed is slow, it determines to be a state where fishing is carried out, and a fishing mark 70 (a mark of fish shown in the mark information of FIG. 3A) is set to the shape of the mark.

For example, when the mark shape determination value is set to 10 kt, processing is carried out as follows. That is, when the inputted ship speed average value is 10 kt or faster, the CPU 11 performs processing for setting the shape of the mark stored at a position where the determination conditions are satisfied, to the cruising mark 60. On the other hand, when the ship speed average value is slower than 10 kt, the CPU 11 performs processing for setting the shape of the mark stored at the position where the determination conditions are satisfied, to the fishing mark 70. By turning on the function of the select speed, the situation of the ship when the mark is automatically inputted can be intuitively grasped by seeing the shape of the mark displayed on the display module 15. The plotter device 1 of this embodiment is configured so that the mark shape determination value, the selected appearance of the mark and the like can be changed by the operator.

In the "select season," the switch of ON/OFF of the function for determining the color and pattern of the mark based on the time and date information at the time of the mark automatic input and the change of the conditions can be performed. In this embodiment, by turning on the season selection function, the color and pattern which are set for each season are set to the color of the mark, as shown in FIG. 3B (in this figure, the colors are substituted by hatchings). The seasonal classification is defined by dividing the time and date information into appropriate time-and-date ranges, and the season is selected based on the time and date information at the time of the mark automatic input. As shown in FIG. 3B, in this embodiment, only when the fishing mark is set to the shape, it can be set so that a color selection by the season selection function is performed.

In the "select water depth," the switch of ON/OFF of the function for determining the color and pattern of the mark based on the water depth information at the time of the mark automatic input and the change of the conditions can be performed. The water depth information is information inputted from the depth sounder 23. In this embodiment, the memory 12 stores the color and pattern according to the water depth in a table form. By turning on the water depth selection function, the color of the fishing mark is set based on the depth information inputted from the depth sounder 23. For example, by setting the color so that it is darker in a stepwise fashion as the water depth becomes deeper, the water depth information can be reflected in the color and pattern of the mark, and the operator can grasp intuitively the water depth at the position where the mark is stored.

Next, the automatic input of the mark is described with reference to FIG. 5. In the following description, a case where the ship speed determination mode is solely set as the determination mode, and the speed selection function and the season selection function are ON is described. Here, the ship speed determination time is set to 5 seconds, the set change amount to 5 kt, and the mark shape determination value to 10 kt. The season selection function is set to perform the color selection only when the fishing mark is set as the shape. Therefore, the cruising mark 60 is always displayed in the same color regardless of the season.

A behavior of a ship 50 at a point P shown in FIG. 5 is described. Here, as an example, it is assumed that the ship speed average value was 10 kt or slower immediately before the ship 50 arrived at the point P, but, because fish was caught when the ship 50 arrived at the point P, it accelerates abruptly up to 20 kt. Such a behavior of the ship 50 satisfies the determination conditions of the marked position setting in the ship speed determination mode. Therefore, the marked position is set to the point P and the fishing mark 70 is set to the shape of the mark based on the ship speed average value. Further, the color and pattern of the mark are determined based on the time and date information. In FIG. 5, because the date and time at which the ship passed through the point P is the date and time classified in autumn, the color and pattern of the mark corresponding to autumn are selected.

Next, a behavior of the ship 50 at a point Q shown in FIG. 5 is described. In this example, the ship speed average value was 10 kt or faster immediately before arriving the point Q, but the ship 50 changed the course in order to head toward the destination at the point Q, and at this time, the ship slowed down by 5 kt or more. Such a behavior of the ship 50 satisfies the determination conditions of the marked position in the ship speed determination mode. Therefore, the marked position is set at the point Q and the cruising mark 60 is set to the shape of the mark based on the ship speed average value. As described above, because the cruising mark 60 is always displayed in the same color regardless of the season when the cruising mark 60 is selected, the processing for setting the color is not performed.

As described above, it turns out that the specific behavior of the ship (course change, fishing, etc.) can be detected by determining the ship speed. In this embodiment, as for the latitude-and-longitude information stored as the marked position, the marked position is set based on the latitude-and-longitude information at the time of starting the count of the ship speed determination time (azimuth direction determination time if it is in the azimuth direction determination mode) when satisfying the input conditions of the marked position. Therefore, in the situation described referring to FIG. 5, the marked positions are set at the point P and the point Q, respectively.

Next, the "prohibited rules" are described with reference to FIGS. 6A to 6D. As the prohibited matters of the mark automatic input, as shown in FIG. 4, the plotter device 1 is configured so that "more than two marks are prohibited within a prescribed range," "a mark is prohibited near the home port," "a mark is prohibited near the coastline," and "a mark is prohibited when another ship is present within a prescribed range" can be set. By turning on these functions (prohibited rules), even when the determination conditions for setting the marked position are satisfied but the conditions of the prohibited rules are satisfied, the marked position is exceptionally not stored in the memory 12.

Figure 6A:
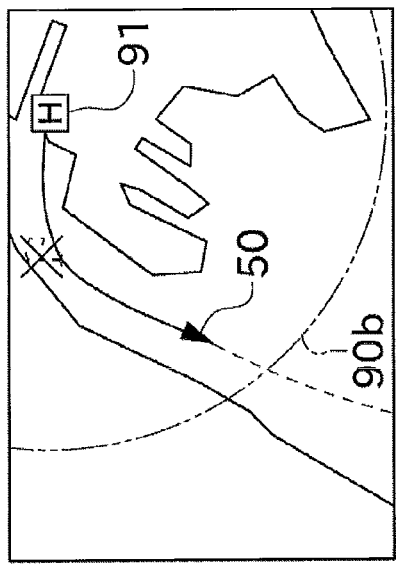
FIGS. 6A to 6D are schematic diagrams of display images showing a case where the mark automatic input is not performed by the prohibited rules.
Figure 7:
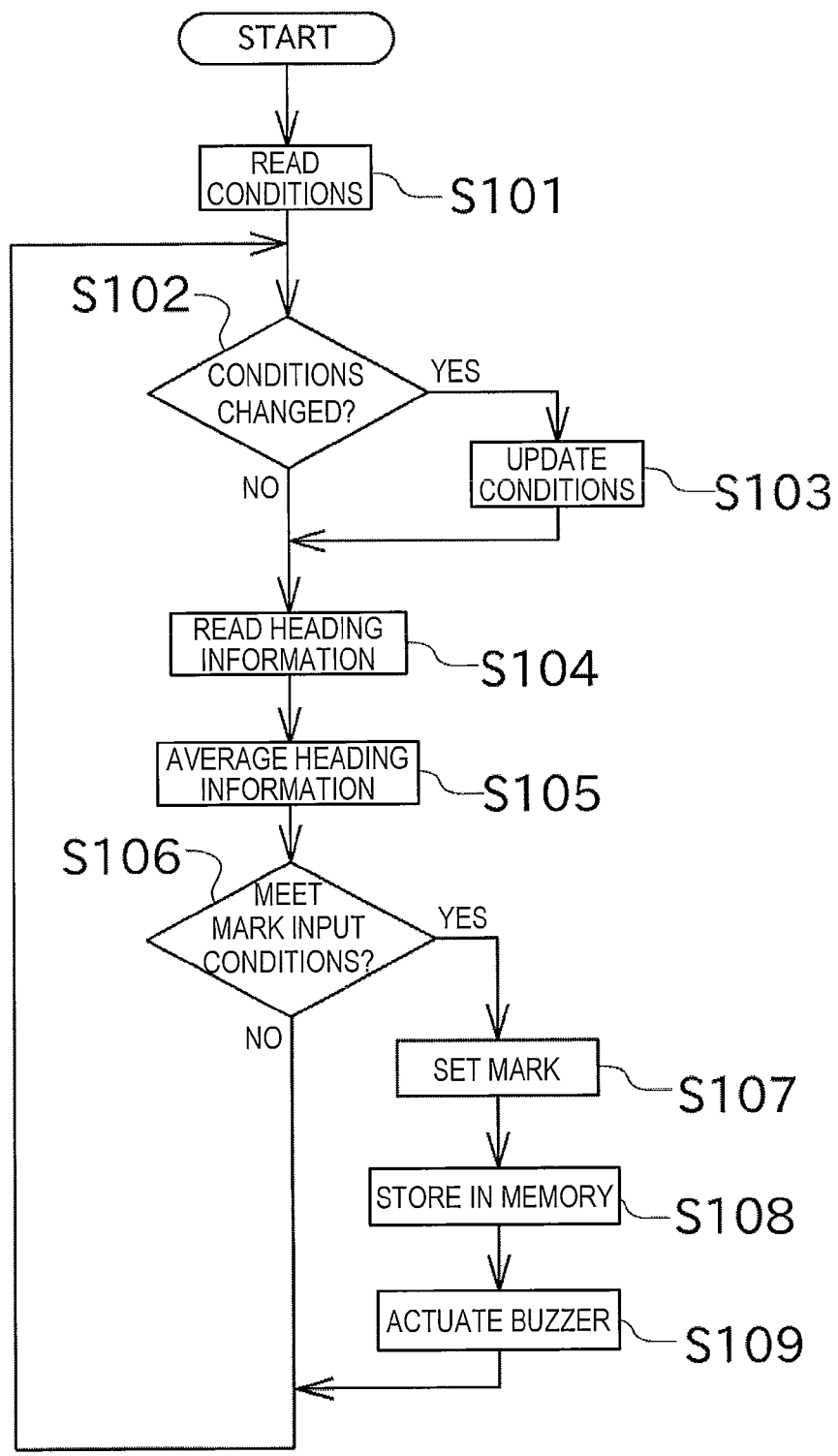
FIG. 7 is a flowchart showing processing of the mark automatic input.

With reference to FIG. 6A, the "more than two marks are prohibited within a prescribed range" function is described. The "more than two marks are prohibited within a prescribed range" is a function in which a new mark is not automatically inputted when a mark is already set in a prescribed range 90a set as a circle of a radius R nm centering on the ship position. As shown in FIG. 6A, by turning on this function, when a mark (cruising mark 60) is present within the prescribed range 90a, a new mark will not be stored even if the determination conditions for setting the marked position are satisfied.

In addition, the plotter device 1 of this embodiment is configured so that a size of the prescribed range 90a is changeable according to the ship speed. In this embodiment, the CPU 11 sets the value of R smaller when the ship speed is fast, and sets the value of R larger when the ship speed is slow. The term "ship speed" as used herein is similar to the ship speed average value described above, and the value of R is set according to the result of comparison of the ship speed average value with the ship speed determination value for the prohibited rule set in advance.

For example, when the ship speed determination value is set to 10 kt, processing is carried out as follows. That is, the CPU 11 sets R to 0.5 nm when the ship speed average value is 10 kt or faster, and sets R to 1.0 nm when slower than 10 kt. Thus, by the CPU 11 performing processing for changing the prescribed range 90a according to the ship speed, the number of marks inputted within the same area becomes more appropriate.

Figure 6B:
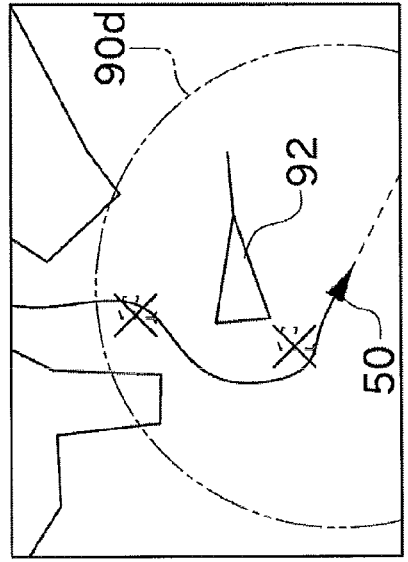

With reference to FIG. 6B, the "mark is prohibited near the home port" function is described. That is, the position of the home port (harbor) 91 and the like of the ship can be registered on the plotter device 1 of this embodiment in advance as its base. The "mark is prohibited near the home port" function is a function in which the mark is not automatically inputted near the position inputted in advance (inputted position) as described above. When the function is turned on, as shown in FIG. 6B, the automatic mark input is prohibited when the ship 50 exists within a prescribed range 90b set centering on the home port 91. Note that the "mark is prohibited near the home port" function may also be configured so that the mark is prohibited when the inputted position exists within a prescribed range defined centering on the ship.

Figure 6C:
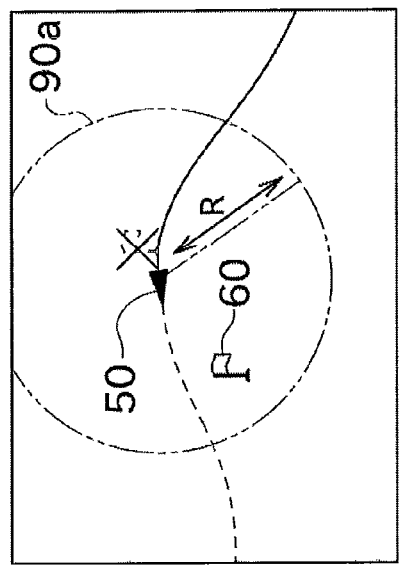

Next, with reference to FIG. 6C, the "mark is prohibited near the coastline" function is described. The "mark is prohibited near the coastline" function is a function to set a prescribed range 90c based on the data of the nautical chart stored in the memory card 35, and to prohibit storing of the marked position. In this embodiment, a range of 2 nm from the coastline is set to the prescribed range 90c. By this function being turned on, the marked position is not stored if the ship 50 is present within the prescribed range 90c as shown in FIG. 6C, even when the determination conditions for setting the marked position are satisfied. Note that the "mark is prohibited near the coastline" function may also be configured so that the mark is prohibited when a land or a coastline exists within the prescribed range defined centering on the ship.

Figure 6D:
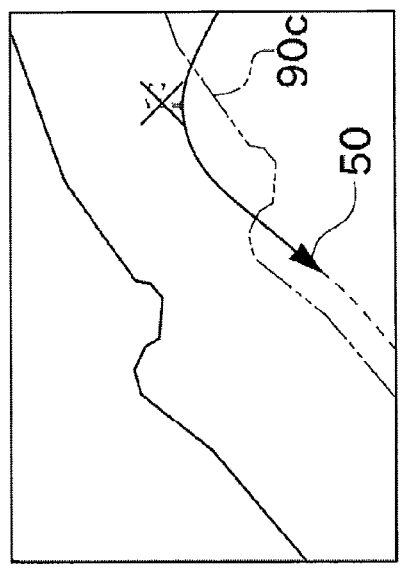

Next, with reference to FIG. 6D, the "mark is prohibited when another ship is present within a prescribed range" function is described. As described above, in this embodiment, the identification information on another ship 92 can be acquired based on the identification information of the AIS carried in the ship 92. The "mark is prohibited when another ship is present within a prescribed range" function is a function to prohibit the storing of the marked position when the identification information of the AIS is received and it is detected that the another ship 92 which is a transmission source of the identification information is present within a prescribed range 90d set centering on the ship concerned. If this function is turned on, the mark is not stored when the another ship 92 which is transmitting the identification information is present within the prescribed range 90d, as shown in FIG. 6D. Note that the "mark is prohibited when another ship is present within a prescribed range" function may also be configured so that the mark is prohibited when the ship concerned exists within a prescribed range defined centering on another ship.

As described above, the automatic mark input can be performed more appropriately by setting the prohibited rule according to the purpose and the like. The plotter device 1 of this embodiment is configured so that the setting method of the prescribed range and the prescribed range itself can be changed according to the displacement, capabilities, purpose and the like of the ship.

The above-mentioned prohibited rules are to keep the marked position only from not being automatically stored and, thus, they do not prohibit manual setting of the mark carried out by the operator. That is, even if the plotter device 1 of this embodiment is in the state where the prohibited rule is ON and the ship concerned exists at the position where the conditions of the prohibited rule are satisfied, the operator can store the marked position by manually inputting the mark.

Next, with reference to FIG. 7, a series of processing of the mark automatic input is described in detail. If the operation key(s) 14 of the plotter device 1 is operated and the mark automatic input is set, a flow of FIG. 7 is started. In the flow of FIG. 7, it is assumed that the azimuth direction determination mode is selected as the determination mode. In the following description, the mark input conditions satisfy the determination conditions of the marked position and do not satisfy the conditions of the prohibited rule, where the marked position (latitude-and-longitude information), time and date, and mark information (appearance of the mark) are stored in the memory 12.

First, the CPU 11 reads the conditions for detecting the ship's behavior (S101). In the processing of S101, the determination mode (azimuth direction determination mode), the mark settings, the prohibited rule, and the various kinds of conditions are read from the memory 12. Next, the CPU 11 checks whether the conditions are changed by the operator (S102). When the conditions are changed by the operator, new conditions are read to carry out update processing (S103).

In processing of S104, the CPU 11 reads the course information indicating the ship's heading outputted from the GPS receiver 13. The CPU 11 averages the read information in a given time range (S105), and then, it determines whether the mark input conditions are satisfied (S106). In the determination processing of S106, it is determined based on the conditions read at S101, or the conditions read in the processing of S103. This determination processing is processing of the determination conditions described above and processing related to the prohibited rule.

As the result of the determination processing of S106, if the mark input conditions are satisfied, various kinds of settings of the mark, such as the mark position and the appearance displayed on the display module 15 are performed (S107). Here, the various kinds of settings include the latitude-and-longitude information (positional information), time and date, appearance information on the mark (shape, pattern, and color). Next, the CPU 11 stores the various kinds of settings set in the processing of S107 in the memory 12 in a table form (S108). The CPU 11 carries out the processing of S108 and transmits the operating signal to the buzzer 16 to actuate the buzzer 16 (S109). After the processing of S109 is finished, the CPU 11 returns to the processing of S102 to repeat the above processing. If it is determined in the processing of S106 that the mark input conditions are not satisfied, the CPU 11 returns to the processing of S102, without performing the processing from S107 to S109. Henceforth, the processing from S102 to S106 (if the mark input conditions are satisfied, up to S109) is repeated until the mark automatic input function is turned off.

Accordingly, the marked position is set so that the course corresponds to the position actually changed, and the mark information is automatically set based on the situation where the marked position is set. The set mark information is displayed on the display module 15 and can also be used when creating the route. The processing is performed in a similar procedure even if the ship speed determination mode is selected for the determination mode.

Summarizing the above, the plotter device 1 of this embodiment is configured as follows. That is, the plotter device 1 includes the GPS receiver 13 and the memory 12. The GPS receiver 13 acquires the positioning signals and calculates the ship position. The GPS receiver 13 calculates the change of the ship position based on the positioning signals. The memory 12 stores the position where the positional change is detected when the positional change that satisfies the determination conditions set in advance is detected.

Thereby, the specific behavior of the ship concerned can be detected by appropriately setting the determination conditions to automatically store the position. Therefore, it can be certainly prevented that the operator lost the location where the fish bite is occurred because he/she forgot the operation of storing the position, and the location for which the mark position is stored deviates greatly from the actual location where the fish bite is occurred. In addition, because the position where the specific behavior exhibited by the ship is stored, the operator can set the position where the specific behavior is detected as the destination, or can set it as a pass point along the route heading toward the destination.

In this embodiment, the plotter device 1 is configured as follows. The GPS receiver 13 calculates the ship speed and direction. If it is detected that the speed calculated by the GPS receiver 13 changes by the predetermined change amount or more within the predetermined period of time, or that the direction calculated by the GPS receiver 13 changes by the predetermined angle or more within the predetermined period of time, the memory 12 stores the position where the change is occurred as the position where the positional change is occurred.

Accordingly, when the ship slows down and changes the heading in order to change the course, such a behavior of the ship is detected and the changed location of the course is automatically stored. Therefore, the route along which the ship traveled can be reproduced more accurately by setting the route from the destination to the starting point so that the route passes through the location stored in the past. Under the specific situation, such as fishing is carried out, also when the ship accelerates abruptly or decelerates abruptly, such a behavior of the ship is detected, and the location where the abrupt acceleration or the abrupt deceleration is actually performed is automatically stored.

Moreover, in the plotter device 1 of this embodiment, at least one of the conditions, such as the ship speed determination time, the azimuth direction determination time, the set change amount, and the set angle, is automatically changed based on the ship speed.

Thereby, the behavior for which the marked position is to be stored can be sufficiently detected by taking the ship speed into consideration.

The plotter device 1 of this embodiment includes the CPU 11 that performs the processing for displaying on the display module 15 the mark at the position where the positional change is occurred.

Thereby, the operator can determine the course of the ship referring to the mark displayed at the position where the specific behavior is detected.

In this embodiment, the plotter device 1 is configured as follows. That is, the memory 12 stores the position where the change is occurred, and stores the ship speed when the change is occurred. The CPU 11 sets the mark of a different appearance according to the ship speed.

Thereby, the situation of the ship which is different according to the ship speed, such as the ship is traveling and fishing is carried out, can be automatically reflected to the shape of the mark.

In this embodiment, the plotter device 1 is configured as follows. That is, the memory 12 stores the position where the change is occurred and stores the time and date at which the position is stored. The CPU 11 displays the mark in a different appearance according to the time and date.

Thereby, because the inputted time and date is reflected to the color and pattern (appearance) of the mark, even when many marks are displayed on the display module 15, it is easy to distinguish the mark from other marks, and is easy to find out the necessary information. If it is the mark stored when the abrupt acceleration (specific behavior) of the ship is detected at the time of catching the fish, it is easy to grasp the time and date at which the fish was caught at the marked location by the time and date information being reflected.

In this embodiment, the plotter device 1 is configured as follows. That is, the plotter device 1 is connected with the depth sounder 23 for detecting the water depth. The CPU 11 displays the mark on the display module 15 by the different color and pattern (appearance) according to the water depth information from the depth sounder 23 when the mark is automatically set.

Thereby, because the water depth information is reflected to the color and pattern of the mark, the operator can grasp the water depth by seeing the mark. Therefore, the operator can obtain the key to determine a classification of the fish which can be caught at the marked location.

The plotter device 1 of this embodiment has a function for setting the prohibited rules to prohibit the marked position from being stored when the predetermined conditions are satisfied.

Thereby, because the mark is not displayed at the less-needed location, it is easy to check the necessary information. In addition, because the excessive inputs of the marks are prevented, the load on the memory 12 can be reduced.

In the plotter device 1 of this embodiment, the predetermined conditions of the prohibited rule are set so that they are satisfied when the positional information stored because of the positional change occurred in the past exists within the prescribed range 90*a* set based on the position of the ship 50 (refer to FIG. 6A).

Thereby, the situation where the marks are excessively displayed in the same area to degrade the viewability of the display module 15 can be prevented.

In the plotter device 1 of this embodiment, the predetermined conditions of the prohibited rule are set so that they are satisfied when the ship concerned exists within the prescribed range 90*c* set with the home port (inputted position) 91 set in advance being the reference position (refer to FIG. 6B).

Thereby, it can prevent the positions from being stored excessively or the marks from being displayed excessively in an area where the mark is not desired to be inputted. For example, it can certainly prevent that a change of the ship speed and a change of the ship's heading which occur by the time the ship 50 departs from the home port 91 and reaches the high seas are detected, and the marks are automatically inputted.

In the plotter device 1 of this embodiment, the predetermined conditions of the prohibited rule are set so that they are satisfied when the ship 50 exists within the prescribed range 90*b* set with respect to the coastline (refer to FIG. 6C).

That is, in the area around the coastline, generally, the necessity of displaying the marks is not high, and because there are many places having complicated geographical features, the ship must change the course frequently in many cases. In this regard, according to the above configuration, it can prevent that the mark is automatically inputted every time the ship changes the direction around the coastline.

The plotter device 1 of this embodiment is connected with the AIS receiver 22 for receiving the identification information on other ships. In the plotter device 1, the predetermined conditions of the prohibited rule are set so that they are satisfied when another ship (or other ships) from which the AIS signal(s) is transmitted exists within the prescribed range 90*d* set based with respect to the ship position.

Thereby, it can prevent that, when the ship concerned takes a temporary evasive action in order to avoid the another ship or other ships, this behavior is detected and the mark is automatically stored. As a result, the storing of the less-needed mark can be reduced.

Although the embodiment of the present invention is described above, the above configuration may be modified as follows.

The determination conditions in the ship speed determination mode of the embodiment may also be configured to be changeable according to the ship speed average value.

In the above embodiment, various kinds of controls related to the mark automatic input are performed based on the ship speed information outputted from the GPS receiver 13. However, the ship speed may be determined based on a signal of an externally-arranged ship speed sensor or a rotation speed of an engine to perform the various kinds of controls. More specifically, a rotation sensor for detecting the rotation speed of the engine which the ship equips may be arranged at an appropriate location, and the signal of the rotation sensor may be inputted to the plotter device 1. Then, the CPU 11 may observe the signal indicating the engine speed inputted at an appropriate timing, and perform various kinds of controls based on the signal.

For example, for the determination conditions at the time of selecting the mark shape in the "select speed" of the mark settings, the engine speed at the start of the determination time (the ship speed determination time or the azimuth direction determination time) may be used. When an engine determination value for determining the engine speed is set to 1000 rpm, the mark shape is determined as follows. That is, when the ship exhibits the behavior that satisfies the determination conditions of the marked position setting, the CPU 11 performs a control for setting the cruising mark 60 if the engine speed at the start of the determination time count exceeds 1000 rpm. On the other hand, the CPU 11 performs a control for setting the fishing mark 70 if the engine speed at the start of the determination time count is less than 1000 rpm. The ship speed is also reflected to the mark shape by this control. The plotter device 1 and the rotation sensor are preferred to be electrically connected with each other so that they can communicate using the communication protocol defined by the NMEA2000.

In the above embodiment, various kinds of controls related to the mark automatic input is performed based on the course information outputted from the GPS receiver 13. However, the ship's heading may be determined based on a signal of an externally-arranged compass to perform the various kinds of controls. Alternatively, differences of the bow direction may be acquired based on information from the GPS compass provided with two or more GPS antennas, and a change of the ship's heading may be detected based on the acquired information.

In the above embodiment, the operator is informed by the buzzer 16 about the mark having been automatically inputted. However, this configuration may be modified appropriately.

For example, a phrase of "a mark has been inputted" may be announced by audio. Although it is preferred to have the informing module in terms of informing the operator about the mark having been automatically inputted, the informing module such as the buzzer 16 may also be omitted from the configuration of the plotter device 1 of the above embodiment.

In addition to the configuration of the above embodiment, the plotter device 1 may be provided with the averaging function of the marked positions. For example, when two or more marks are inputted into the predetermined range, it may be possible to average the positions of these marks by an appropriate method, and to re-set the two or more marks as one mark. Thereby, an improvement in the viewability of the display screen and a reduction of the display load can be realized.

In the above embodiment, when the prohibited rule is set and the conditions of the prohibited rule are satisfied, the marked position is not stored in the memory 12. However, this configuration may be appropriately modified according to situations. For example, the plotter device 1 may be constituted as follows. That is, even if the prohibited rule is set and the conditions of the prohibited rule are satisfied, the plotter device 1 stores the position in the memory 12 if the specific behavior is detected. At this time, the memory 12 stores the information such as the position of the mark and information indicating that it falls under the prohibited rule. Then, the CPU 11 processes so as not to display on the display module 15 the mark inputted in the state where the conditions of the prohibited rule are satisfied. Also by this configuration, because the mark is not displayed at an unnecessary location, the operator can be prevented from being difficult to check necessary information.

In the above embodiment, the GPS receiver 13 is arranged in the plotter device 1. However, the GPS receiver may be arranged externally.

In the above embodiment, the GPS receiver 13 functions as the position calculating module as well as functions as the behavior calculating module. However, the plotter device 1 is not limited to this configuration. For example, the plotter device 1 may also be configured so that the CPU 11 functions as the behavior calculating module for calculating the ship speed and heading based on the positioning signals.

In the above embodiment, the positioning signals are received based on the signals from the GPS satellites. However, if the GNSS (Global Navigation Satellite System) is used, the configuration may be modified appropriately. For example, the positioning signals from the GLONASS satellites or the GALILEO satellites may be received instead.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A ship display device comprising:
 a position calculating module configured to acquire a positioning signal of a ship and to calculate a position of the ship;
 a behavior calculating module configured to calculate a direction of the ship based on the positioning signal;
 a position storage module configured to store a position in response to determining that the direction that has been calculated by the behavior calculating module changes by at least a predetermined angle within a predetermined period of time; and
 a mark display processing module configured to display, in a display screen, a current travel mark at the position stored in the position storage module during a current travel of the ship, and a prior travel mark at a previously stored position, the previously stored position corresponding to the position stored in the position storage module during a previous travel of the ship prior to the current travel.

2. The ship display device of claim 1,
 the position storage module being further configured to store a speed of the ship at the position; and
 the mark display processing module being configured to display the current travel mark in a different appearance according to the speed of the ship.

3. The ship display device of claim 1,
 the position storage module being further configured to store a time associated with the position; and
 the mark display processing module being configured to display the current travel mark in a different appearance according to the stored time.

4. The ship display device of claim 1, the ship display device being configured to connect with a depth sounding module configured to detect a water depth; and the mark display processing module being configured to display the current travel mark in a different appearance according to the water depth detected at the stored time.

5. The ship display device of claim 1, wherein the ship display device is configured to prohibit storing of the position when a predetermined condition is satisfied.

6. The ship display device of claim 5, wherein the predetermined condition is satisfied when a previously stored ship position is within a prescribed range set based on the position of the ship.

7. The ship display device of claim 5, wherein the predetermined condition is satisfied when the ship is within a prescribed range set based on an inputted position set in advance, or when the inputted position set in advance is within a prescribed range set based on the position of the ship.

8. The ship display device of claim 5, wherein the predetermined condition is satisfied when the ship is within a prescribed range set based on a coastline, or when the coastline is within a prescribed range set based on the position of the ship.

9. The ship display device of claim 5, wherein
the ship is a first ship;
the ship display device further comprises a communication device configured to connect with an identification information receiver for receiving identification information transmitted from a second ship; and
the predetermined condition is satisfied when the second ship that transmitted the identification information is within a prescribed range set based on the position of the first ship, or when the first ship is within a prescribed range set based on a position of the second ship.

10. The ship display device of claim 1, the mark display processing module being configured to refrain from displaying the current travel mark on the display screen when a predetermined condition is satisfied.

11. The ship display device of claim 1, where a positioning change that satisfies a determination condition set includes a positioning change associated with a fish bite.

* * * * *